July 19, 1966  A. C. CATLAND  3,261,241
POWER PIPE TONGS

Original Filed June 20, 1962  7 Sheets-Sheet 1

INVENTOR
ALFRED C. CATLAND

BY
ATTORNEY

FIG. 3.

INVENTOR
ALFRED C. CATLAND
BY Joseph R. Dwyer
ATTORNEY

July 19, 1966

A. C. CATLAND 3,261,241

POWER PIPE TONGS

Original Filed June 20, 1962

INVENTOR
ALFRED C. CATLAND

BY *Joseph R. Dwyer*

ATTORNEY

July 19, 1966  A. C. CATLAND  3,261,241
POWER PIPE TONGS
Original Filed June 20, 1962  7 Sheets-Sheet 4

INVENTOR
ALFRED C. CATLAND
BY Joseph R. Dwyer
ATTORNEY

FIG. 8.

United States Patent Office 3,261,241
Patented July 19, 1966

3,261,241
POWER PIPE TONGS
Alfred C. Catland, Alhambra, Calif., assignor, by mesne assignments, to Byron Jackson, Inc., Long Beach, Calif., a corporation of Delaware
Continuation of application Ser. No. 203,872, June 20, 1962. This application Feb. 17, 1965, Ser. No. 438,172
5 Claims. (Cl. 81—57)

This application is a continuation of U.S. application for Letters Patent, Serial No. 203,872, filed June 20, 1962, now abandoned, which latter application is a continuation-in-part of U.S. application for Letters Patent, Ser. No. 813,374, filed May 15, 1959, now abandoned.

The present invention relates to power tongs of the type employed in making up and breaking out pipe joints in strings of well pipe such as well casing, drill pipe and tubing.

It is the practice in the drilling, completion and production of oil wells to employ tonging devices engageable with the well pipe to impart rotation to a stand of such pipe which is supported in the surface rigging above the well so as to make a threaded connection of such stand of pipe with the pipe string extending into the well, or to remove such stand of pipe from the string of pipe leading into the well as the case may be. Hand tongs may be employed for this purpose; however, power-operated devices have been developed, which substantially expedite the procedure of rotating the stand of pipe supported in the well rigging, thus effecting a substantial savings in time in running into the well a string of pipe, or in removing such string of pipe from the well.

An object of the present invention is to provide a power tonging device having a gripping mechanism automatically engagement with the pipe so as to effect rotation thereof, the tongs having a radial opening or throat permitting application of the tongs to the pipe and removal of the tongs therefrom.

Another object of the invention is to provide a tonging head which is automatically operable to engage the pipe to effect rotation thereof in either direction upon reversal of the drive to the tonging head. In accordance with this objective, the tonging head is provided with a radial throat for the reception of the pipe to be rotated, and within the throat there is revolvably disposed a gripping mechanism comprising an inner pipe engaging partial ring, this pipe engaging ring being driven by an outer drive ring and including a number of circumferentially spaced die means, certain of which are adapted to be automatically moved into engagement with the pipe, or retracted from engagement with the pipe responsive to relative rotation between the inner and outer rings. These die means are preferably arranged in angularly spaced relation about the pipe when engaged therewith, so as to impose uniform forces on the pipe, thus to minimize distortion or crimping of the pipe.

A further object is to provide a throated tonging head including relatively fixed die means disposed in opposed relation to the throat in combination with die means movable into engagement with a pipe disposed in the head in such angularly spaced relation to the fixed die means as to impose on the pipe a force component urging the pipe into engagement with the fixed die means, wherein the movable die means will be operated responsive to rotation of the tonging head in either direction. With such a construction, the need for interchangeable fixed and shiftable die means or "roll-over" tong hangers is avoided. Certain manufacturing economies also accrue by reason of a construction made in accordance with this objective.

Other objectives and advantages of the invention will hereinafter be described or will become apparent to those skilled in the art, and the novel features of the invention will be defined in the appended claims.

Referring to the drawings.

Like reference characters in the several views of the drawings and in the following detailed description designate corresponding parts.

Figure 1:
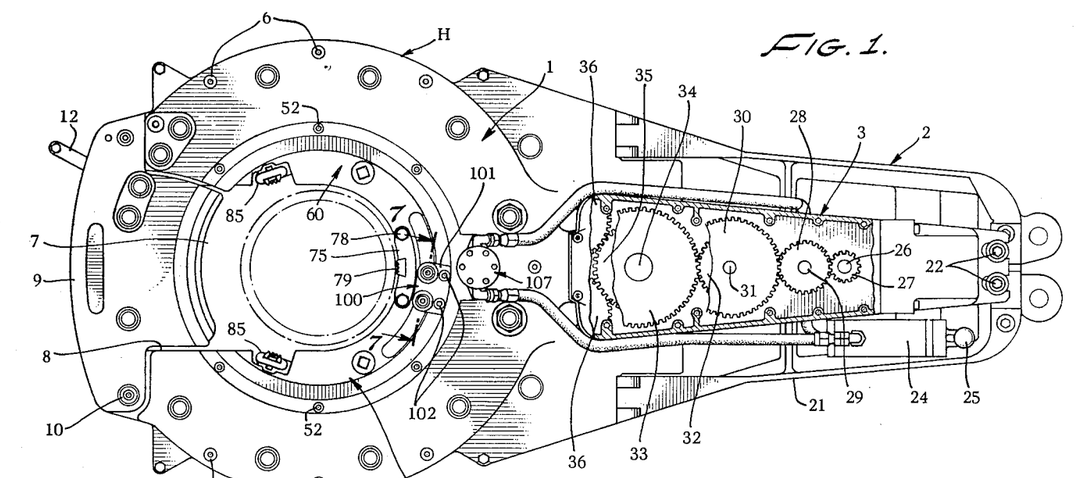
FIG. 1 is a top plan view of a power tong made in accordance with the invention, with a portion of the gear case removed to expose the power train to the tonging head.
Figure 2:
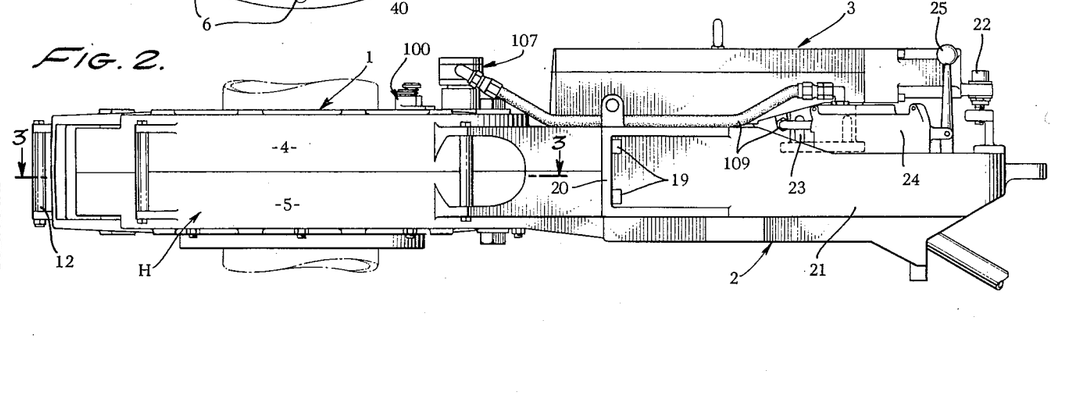
FIG. 2 is a side elevational view of the tong of FIG. 1.

Referring particularly to FIGS. 1 and 2, the tong of the present invention comprises three major components, namely, a tonging head generally designated 1 which is supported upon a lever generally designated 2, the lever 2 having disposed thereon a gear box generally designated 3.

The tonging head 1 comprises a frame or housing H composed of complemental housing sections 4 and 5, secured together along the mid-plane of the head as by a suitable number of through fasteners 6. The tonging head 1 has a pipe opening 7, and is also provided with a radial throat 8 leading into the pipe opening 7 along the longitudinal center of the tong.

Supported by the frame or housing H is a gate 9 pivotally connected as at 10 to the frame or housing H at one side of the throat 8, and adapted to bridge the throat and to be releasably latched at its free end to the frame or housing H at the opposite side of the throat 8.

Figure 3:
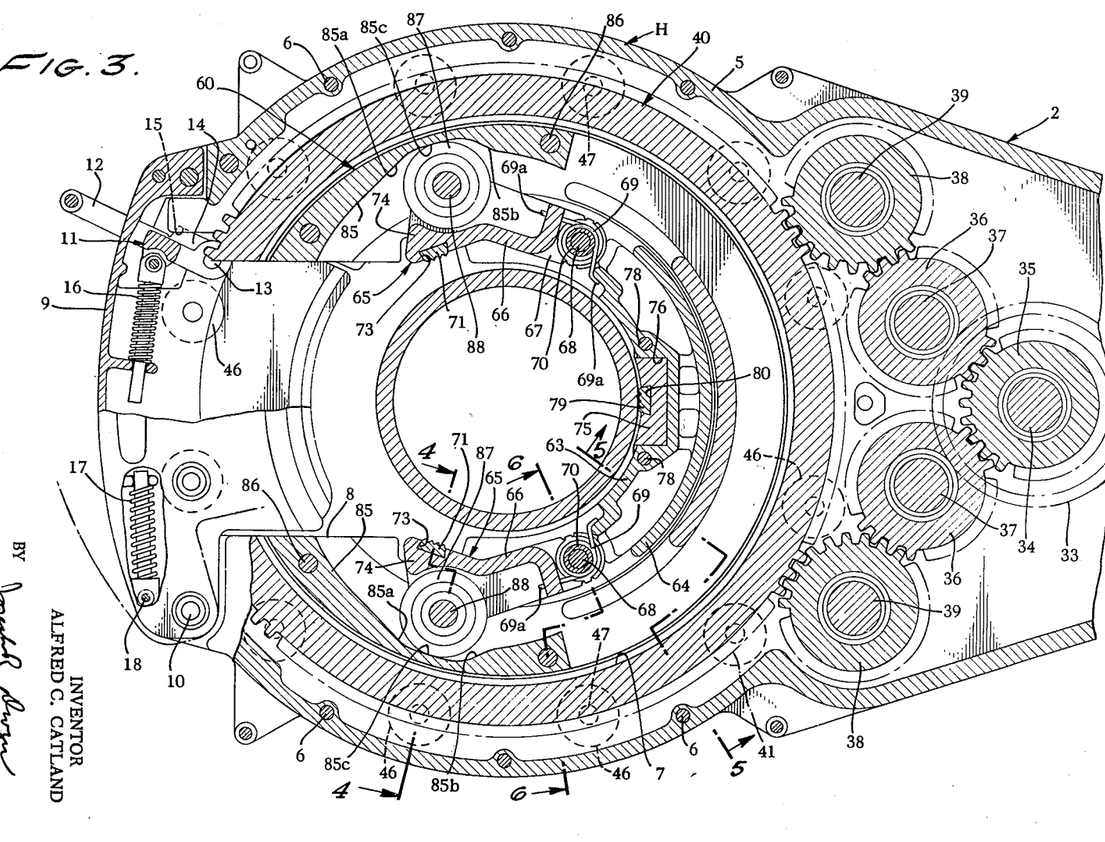
FIG. 3 is an enlarged view in horizontal section as taken on the line 3—3 of FIG. 2, but with certain of the parts shown in elevation.

Referring to FIG. 3, latch means generally designated 11 are carried by the gate 9. This latch means includes an arm 12 pivotally carried by the gate as at 13 internally thereof and projecting through the gate 9 to enable manual operation of the latch arm 12. Carried by the arm 12 is a latching lug 14, engageable in a recess 15 in frame or housing H adjacent the mouth of the throat 8, and spring means 16 are employed to normally bias the arm 12 in a position to effect engagement of the lug 14 in the recess 15.

In addition, spring means 17 are pivotally supported as at 18 to the frame or housing H at the opposite side of the throat 8 from the recess 15, and in spaced relation to the pivotal mounting 10 of the gate 9 to the housing H. This spring means is adapted to bias the gate 9 to a closed position and to bias the gate 9 to an open position respectively, as the line of force of the spring means passes over a center line leading through the pivot support 10 of the gate 9 and the pivot support 18 of the spring means 17.

The gate construction forms no part of the present invention and therefore need not be described in further detail.

At its inner end the housing or frame H is secured to the lever 2 as by means of a suitable number of screw fasteners 19 extending through vertical webs 20 of the lever 2 which are carried by transversely spaced side walls 21 of the lever.

The gear box 3 previously referred to is appropriately mounted at one end to the frame or housing H, and at its other end is anchored to the free end of the lever 2 as by anchor bolts 22. Disposed beneath the gear box adjacent the free end of the lever, as shown in FIG. 2, is an appropriate motor device such as a hydraulic motor 23, which is controlled by an appropriate valve mechanism 24 disposed to one side of the gear box 3, and including an operating lever 25, so as to drive the motor output shaft in either direction.

It will be noted that the output shaft of the motor 23 is designated 26 in FIG. 1, and has mounted thereon a drive gear 27, meshing with an idler gear 28 which is mounted on a shaft 29 journalled in the gear box 3. The idler gear 28 is in turn engaged with a large gear 30 mounted on a shaft 31 which is also journalled in the gear box 3, and which has a gear 32 mounted thereon and disposed beneath the large gear 30. Gear 32 is in mesh with a gear 33 which drives shaft 34 on which it is mounted, the shaft 34 also having thereon beneath the gear 33, a gear 35. Gear 35, as shown in FIG. 1, as well as in FIG. 3, is in mesh with a pair of idler gears 36, 36 disposed at opposite sides of the longitudinal center of the tong and mounted on shafts 37, 37 which are preferably journalled in the upper and lower section 4 and 5 of the housing or frame H. Gears 36 in turn are meshed with a pair of drive gears 38, 38 mounted on shafts 39, these shafts also preferably being journalled in the housing or frame sections 4 and 5.

The gears 38 being driven by the gear train comprising gears 27, 28, 30, 32, 33, 35 and 36, constitute means for imparting rotation to an outer partial drive ring generally designated 40, having on its outer periphery a bull gear 41. The outer ring 40 has a side or radial opening therein adapted, in a manner which will hereinafter be more particularly described, to be aligned with the throat 8 through the frame or housing H for the reception of a pipe section.

Figures 4, 5:
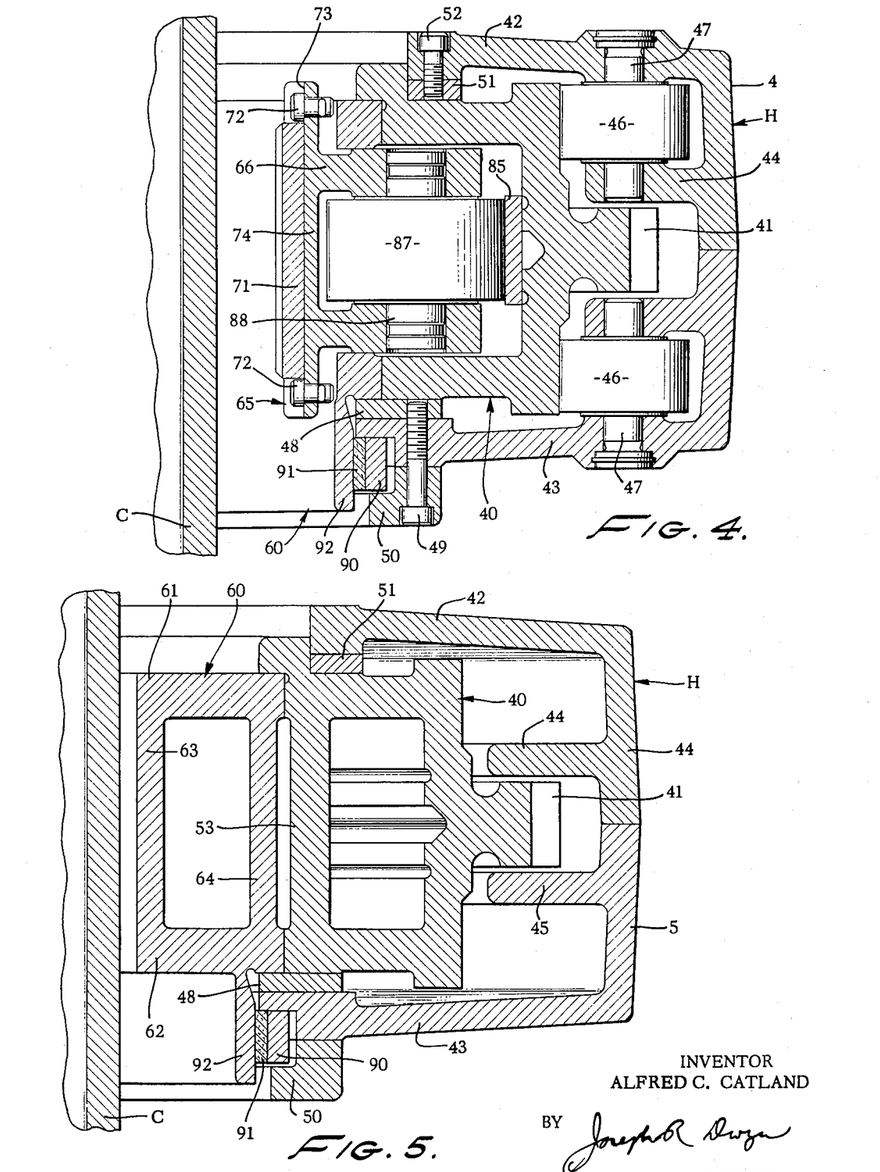
FIG. 4 is an enlarged fragmentary view in section as taken on the line 4—4 of FIG. 3.
FIG. 5 is an enlarged fragmentary view in section as taken on the line 5—5 of FIG. 3.

As is best seen in FIGS. 4 and 5, the housing or frame H is generally of channel cross-section, and is formed with opposing arcuate upper and lower walls 42 and 43 respectively. Internally thereof the frame or housing H is provided with a pair of circumferentially extended flanges 44 and 45 in the housing sections 4 and 5, respectively, and disposed in opposed spaced relation to the upper and lower walls 42 and 43. At a plurality of circumferentially spaced points, rollers 46 mounted on shafts 47 are mounted within the housing or frame H, with the shafts 47 supported in the opposing upper and lower walls 42 and 43 of the housing and the circumferentially extended flanges 44 and 45 (see FIG. 4). Accordingly, it will be noted that the rollers 46 constitute means for containing the outer partial ring 40 for rotation about its axis.

The outer partial ring 40 is vertically supported upon a wear ring or partly circular bearing ring 48, which is secured to the lower wall 43 of the housing H, as by means of a suitable plurality of circumferentially spaced fasteners 49. Also mounted on the outer surface of the lower wall 43 of the housing H is an L-shaped partly circular ring 50, constituting a shield for brake means which will hereinafter be more particularly described. In addition, there is a wear ring or partly circular bearing ring 51 carried at the inner periphery of the upper wall 42 of the housing and engaged with the outer partial ring 40, so as to constrain the partial ring 40 against substantial axial play within the housing or frame H. This bearing ring 51 is secured to the top wall 42 of housing H as by means of a suitable number of fasteners 52 disposed in circumferentially spaced relation.

Figure 8:
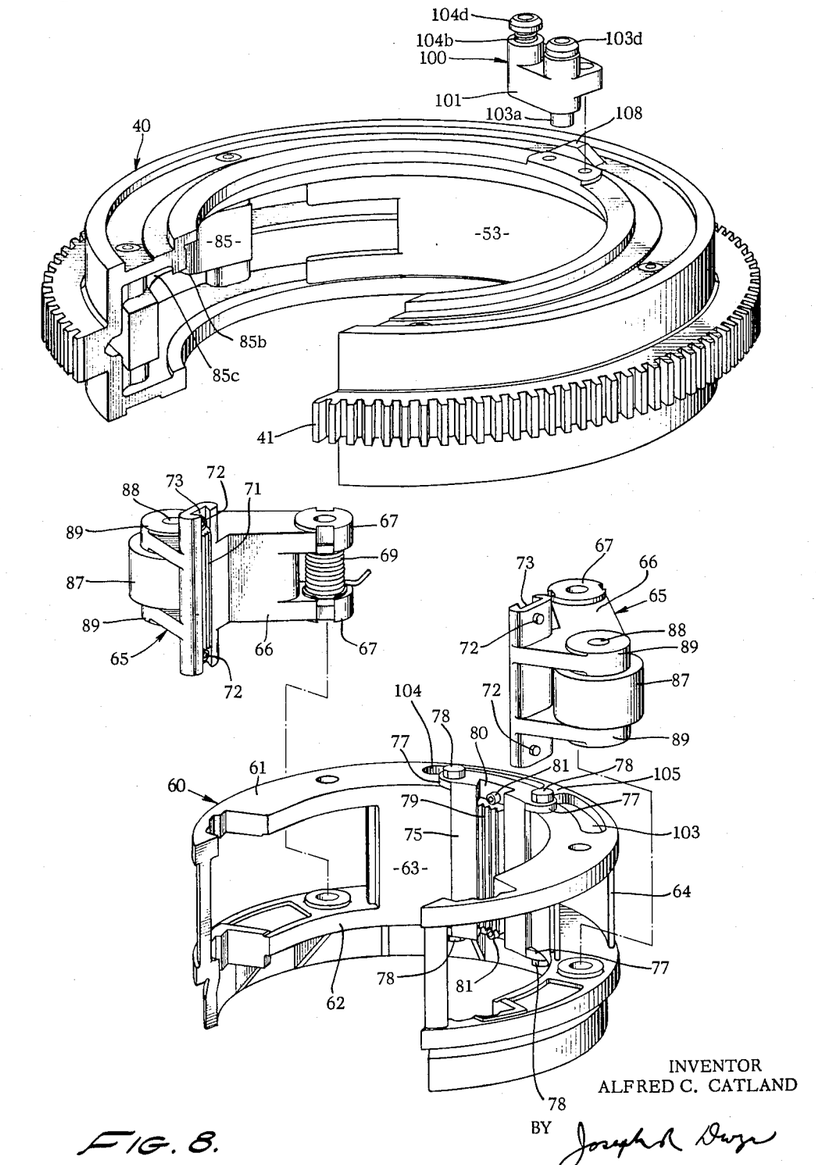
FIG. 8 is an exploded detail view, more particularly illustrating the partial pipe gripping and partial drive rings of the tonging head of the present invention.

The outer partial ring 40 is preferably a casting which as shown in FIGS. 4, 5 and 8, is of channel section adjacent the extremities thereof, there being an arcuate wall designated 53 at the inner periphery of the outer ring 40 and at the rear of the ring in opposed relation to the lateral pipe-receiving opening in the ring, so as to provide a rigid cross-sectional box configuration.

Disposed within the outer partial ring 40 is an inner partial ring generally designated 60, which also is preferably a casting having a lateral pipe opening adapted, in a manner which will hereinafter more particularly appear, to be aligned with the pipe opening in the outer ring 40.

The inner ring 60 as shown herein, comprises an upper wall 61 and a lower wall 62, having at its base, in opposed relation to the pipe opening therein, an inner vertical wall 63 and an outer vertical wall 64. Accordingly, at its base, the inner ring 60 is substantially of box-like cross-section, while adjacent to the extremities of the ring 60 there is a radial space for the reception of a pair of jaws generally designated 65.

The jaws 65 respectively comprise a body 66 having at one end a pair of mounting lugs 67, 67 (see FIG. 6) through which extends a pin 68 about which the jaws 65 are adapted to pivot for swinging movements towards and away from a section of pipe disposed within the pipe opening in the inner ring 60. Preferably the pin 68 is threaded as at 68' so as to be retained in the upper wall 61 of the inner ring 60, and extends through the mounting lugs 67 of the respective jaws 65, and into the lower wall 62 of the inner ring 60.

In order to bias the jaws outwardly with respect to the pipe opening in the inner ring, a torsion spring 69 is preferably disposed on a centering sleeve 70 disposed about the respective pins 68, these springs 69 having their ends 69a engaged as best seen in FIG. 3, with the inner vertical wall of the inner ring 60 and with the jaws between the mounting lugs 67, in such a manner that inward movement of the jaws 65 about the pivot pins 68 will store energy in the springs 69 to bias the jaws 65 outwardly.

Each of the jaws 65 is preferably provided with a removable pipe gripping die segment 71 retained as by pins 72 (see FIG. 8) in undercut or dove-tailed vertically extended slots 73 in the pipe engaging end 74 of the respective jaws 65.

In addition, the inner ring 60 is provided with relatively stationary die means disposed in opposed relation to the pipe opening in the inner ring 60, and in the illustrative embodiment such die means comprises a die carrier block 75 disposed in a vertically extended slot 76 in the wall 63 of the inner ring 60, and having at its upper and lower extremities outstanding ears 77 for the reception of through bolts 78, whereby the block 75 is removably secured to the inner ring 60. Removably carried by the die block 75 is a die insert 79 disposed in an undercut vertically extended slot 80 in the block, and contained therein as by pins 81 or the like.

In order to effect movement of the jaws 65 about the pivot pins 68, the jaws 65 and the outer ring 40 have cooperative cam means to force the jaws inwardly responsive to slight relative angular displacement of the outer ring 40 with respect to the inner ring 60. In the illustrative embodiment of FIGS. 1 through 8, such cam means comprises a pair of compound cams 85, 85 carried by the outer ring 40, or integrally formed in the outer ring as may be desired. These compound cams 85 are each herein shown as being removably secured within the outer ring 40 as by a pair of fasteners 86.

As best seen in FIG. 3 the pair of cams 85 provide a pair of opposed ramps 85a, 85a, and a pair of opposed ramps 85b, 85b engageable with rollers 87 rotatably supported by a shaft 88 journalled in opposed ears 89, 89 projecting outwardly from the pipe engaging end 74 of the respective jaws 65. Accordingly, upon relative angular movement between the outer ring 40 and the inner ring 60 in one direction, the opposed ramps 85a, 85a will engage the rollers 87 of the jaws 65 to cam the jaws inwardly about the pivot pin 68. On the other hand, relative angular displacement between the outer ring 40 and the inner ring 60 in the other direction will bring the opposed ramps 85b, 85b into engagement with the rollers 87 to effect inward pivotal movement of the jaws 65 about the pins 68.

Intermediate the ramps 85a and 85b of the respective compound cams 85, is an arcuate neutral section 85c constituting the low point of the compound cams, whereby the jaws will be caused by springs 69 to swing outwardly away from a section of pipe disposed in the pipe openings as the rollers 87 ride down either ramps 85a or ramps 85b onto neutral section 85c.

Figure 6:
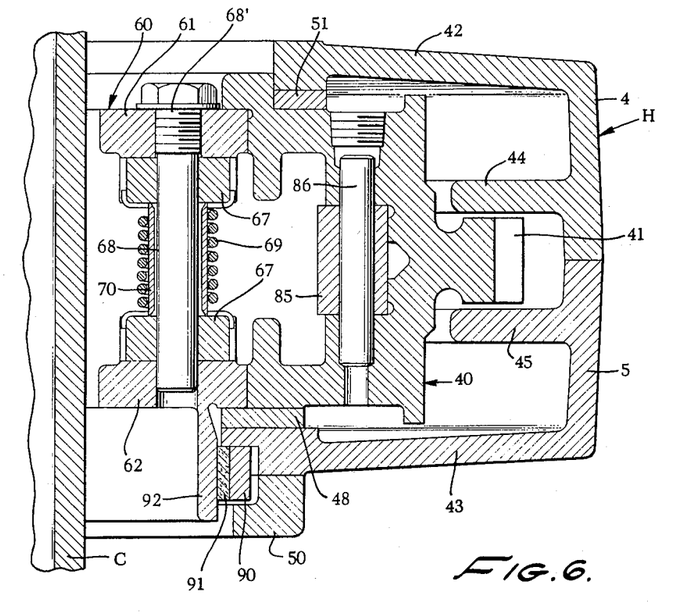
FIG. 6 is an enlarged fragmentary view in section as taken on the line 6—6 of FIG. 3.

From the foregoing, it will be apparent that the inner ring assembly constitutes a pipe gripping mechanism operable responsive to rotation of the outer ring 40 relative to the inner ring 60. In order to effect such relative rotation, brake means as previously generally referred to are employed to frictionally resist rotation of the inner ring 60 relative to the housing or frame H. Such brake means in the illustrative embodiment, as best seen in FIGS. 4, 5 and 6, comprises a brake band 90, having a friction lining material 91 thereon engageable with a depending flange 92 on the lower wall 62 of the inner ring 60. The brake band 90 is connected to the housing or frame H in any suitable manner, as by pins or the like, as more particularly shown and described in U.S. Patent No. 2,650,070 issued August 25, 1953 to C. A. Lundeen.

While it will be apparent that if desired the inner ring 60 and the outer ring 40 may be positioned relative to the throat 8 through the housing or frame H, so as to permit the application of the tong to, and the removal of the tong from a pipe joint, by means of manipulation of the control valve 25 which controls the drive to the outer ring through the gears previously described, it is preferred that means be provided for relatively positioning the inner ring and the outer ring, and that means also be provided for relatively positioning the outer ring and the housing or frame.

Figure 7:
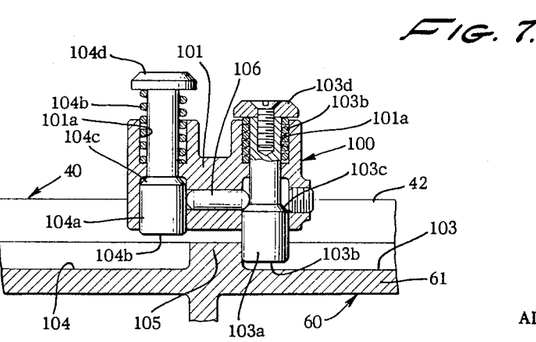
FIG. 7 is a fragmentary view in section as taken on the line 7—7 of FIG. 1.

Accordingly, an inner ring positioning device generally designed 100 and best illustrated in FIGS. 1 and 7 is employed to alternately limit relative rotation between the inner and outer ring 60 and 40 respectively in one direction, so that the radial pipe openings therein are in radial alignment.

The positioning device 100 includes a body 101 mounted on the upper surface of the outer ring 40, as by a suitable number of fasteners 102, and overlying the inner ring 60. In the upper wall 61 of the inner ring is a pair of circumferentially spaced and arcuate slots 103 and 104, there being an abutment section 105 between the slots 103 and 104. Shiftably disposed in the body 101 is a pair of pins 103a and 104a, having inner ends 103b and 104b which are alternately engageable in the circumferentially extended slots 103 and 104. Each of these inner ends 103b and 104b is provided with a bevelled surface 103c and 104c, respectively, alternately engageable with a detent 106 which is shiftably disposed in the body 101 for movement into engagement with the respective bevelled surfaces 103c and 104c upon depression of the pins 103a and 104a.

Each of the pins is provided with a head 103d and 104d, with which is engaged a compression spring 103e and 104e; these springs are seated in bores 101a in the body 101 so as to normally bias the respective pins outwardly with respect to the slots 103 and 104. However, it will be observed that when one pin is manually depressed, the spring acting on the other pin will shift the latter outwardly; thus camming the detent 106 into engagement with the bevelled surface of the other pin so that depression of one pin automatically effects release and retraction of the other pin from slot 103 or 104, as the case may be, by means of the spring engageable with the respective pin head, and retention of the pin which is manually depressed in the respective slots 103 or 104, as the case may be, will also be effected. However it will be noted that with either of the pins 103a and 104a disposed in the slots 103 or 104 and engaged with the abutment 105, the outer ring 40 and the inner ring 60 will be relatively angularly positioned such that the lateral pipe openings therethrough are in alignment.

In order to position the outer ring 40 relative to the housing or frame H, positioner valve means 107 (see FIG. 1) are employed, such valve means being more particularly shown and described in U.S. Patent No. 2,780,950, dated February 12, 1957, to J. H. Province. The positioner valve means 107 as will be apparent upon reference to the just-mentioned Patent No. 2,780,950, is adapted to cooperate with a positioner cam 108, which, as best seen in FIG. 8 is disposed on the upper surface of the outer ring 40 so as to actuate the valve 107. Connecting the positioner valve 107 to the control valve mechanism previously described are hydraulic lines 109, 109 as best seen in FIGS. 1 and 2.

It will be apparent that the function of the positioner valve means 107 is to shut off the flow of power fluid to the motor 23 when the control valve 25 is conditioned to render the positioner valve 107 operative, whereby the outer ring 40 will cease rotation when the pipe opening therethrough is aligned with the throat of the housing or frame H.

The operation of the present tong as specifically described in the foregoing is as follows, assuming the tong to be operating in a manner such as to effect clockwise rotation of the outer ring 40 and consequently the pipe gripping means as shown in FIGS. 1 and 3.

It will be noted with reference to FIG. 7, that end 103b of inner ring positioning pin 103a is depressed in slot 103 so as to engage stop projection 105. Accordingly, the outer ring 40 which carries the body 101 is free to rotate in the clockwise direction relative to the inner ring 60. However inner ring 60 is frictionally restrained against such rotation by reason of frictional engagement of the friction lining material 91 on the brake band 90 with the depending flange 92 which is effectively an integral part of the inner ring 60. Such rotation of the outer ring 40 relative to the inner ring 60, therefore, will cause engagement of opposing cam surfaces 85b of camming means 85 with the respective rollers 87 of jaws 65, so that the jaws will be pivoted about pins 68 into engagement with a tool joint or section of well casing C or other pipe disposed within the pipe opening in the inner ring 60. Such pivotal movement of the jaws 65 will force the pipe or casing C into engagement with the die means comprising die 79 which is at a location opposite the pipe opening in the outer partial ring 40.

In this connection it will be noted that the die 79 constitutes in effect die means which are virtually carried by the outer partial ring 40, inasmuch as the inner jaw-carrying ring 60 is mounted for rotation in the outer ring 40.

Further, it should be noted that the dies 71 carried by the pipe-engaging ends 74 of jaws 65 are spaced about the pipe opening relative to the die 79 at the base of the inner ring 60, such that the respective dies will have contact with the pipe at circumferentially spaced points about the latter.

It will be recognized that in order to provide a component of force by reason of engagement of the dies 71 with the casing or pipe C, tending to urge the casing or pipe C into engagement with the die 79, that the dies 71 must engage the pipe at points spaced from the die 79 at least slightly in excess of 90 degrees. Stated otherwise, it might be said that the present invention provides shiftable die means, namely, dies 71 carried by jaws 65 engageable with sectors of a well pipe disposed within the pipe gripping mechanism which are at the opposite side of a diametrical line extending across the pipe from the die means including the die 79, which, if desired, may have engagement with the pipe over a substantial angular extent in opposed relation to the dies 71. Symmetry of the pipe engaging die system, however is preferably maintained in order to equally distribute the pipe-engaging forces about the pipe.

As the jaws 65, as previously mentioned, are caused to swing into engagement with the well pipe or casing C, so that the latter is gripped between dies 71 and 79, the inner ring 60 by reason of engagement of rollers 87 with cam surfaces 85b will be locked up with the outer ring 40, so that rotation of the outer ring 40, the inner ring 60 and the pipe or casing C, as a unit, will result. When it is desired to release the casing or pipe from the gripping mechanism, control valve means 25 will be actuated to reverse the direction of rotation of the outer ring 40, whereupon the rollers 87 will ride down the opposite ramps 85b to the circumferentially extended low section 85c of the respective compound cams 85. At this time stop pin end 103b which is disposed in slot 103 as shown in FIG. 7, will abut with the stop projection 105 so as to prevent further counterclockwise rotation of the outer ring 40 relative to the inner ring 60, so that these rings will accordingly rotate in a counterclockwise direction in unison.

Such unitary counterclockwise rotation will continue until such time as the positioning cam 108 cooperates with positioning valve means 107 previously referred to, to halt rotation of the outer ring 40, at which time the radial pipe openings in the outer ring 40 and the inner ring 60 will be aligned with the throat 8 through the housing or frame H. Thus, removal of the tong from the well pipe or casing C is permitted upon opening of the gate 9, and in addition the tong gripping mechanism is in position for reapplication of the tong mechanism to another pipe joint to be made up.

In the case where pipe joints are to be broken out by means of the present tong, it will now be recognized that it is only necessary to depress positioning pin 104a so that end 104b projects into slot 104 in inner ring 60, and pin 103a is retracted, whereupon relative rotation between the outer ring 40 and the inner ring 60 will be permitted only in a direction in which the outer ring rotates in a counterclockwise direction as viewed in FIGS. 1 and 3, so as to effect engagement of opposing cam surfaces 85a, 85a, with rollers 87.

Figure 9:
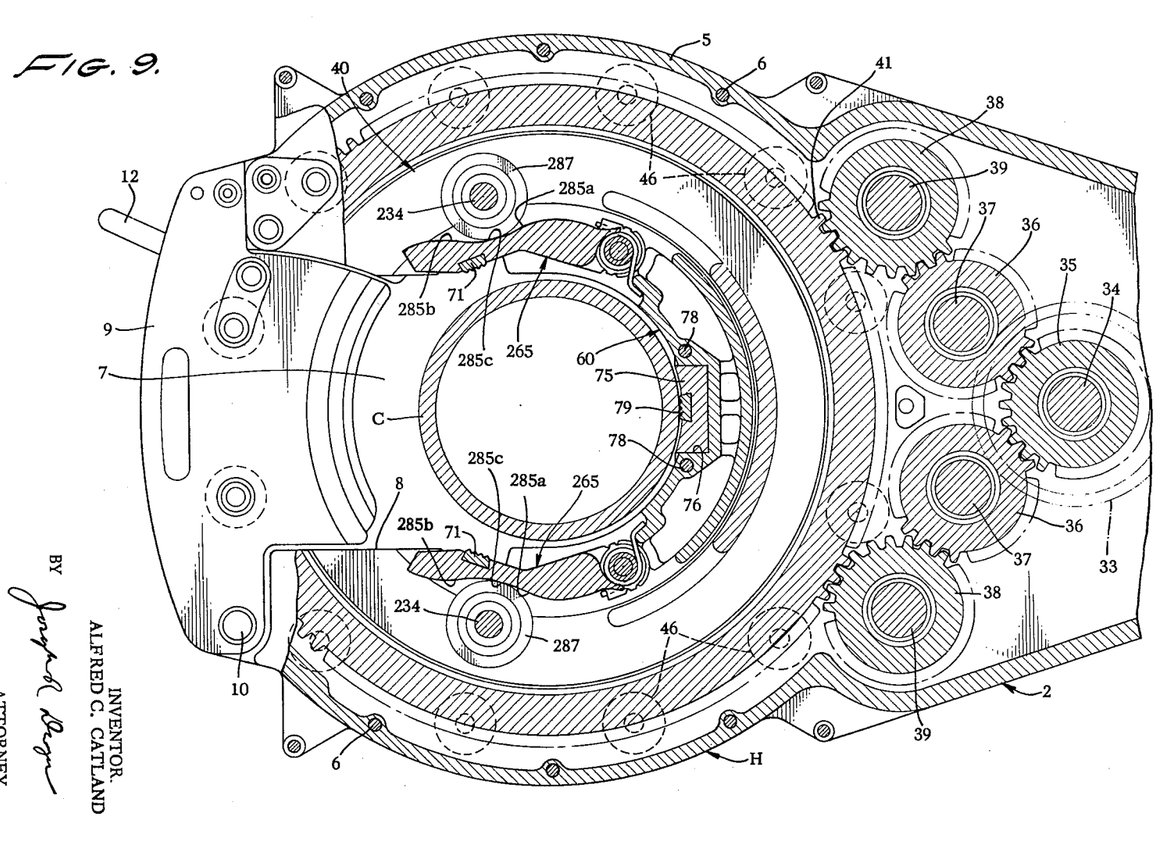
FIG. 9 is a view similar to FIG. 3, but illustrating a modified form of the invention.

Referring now to FIG. 9 wherein a modified construction is shown, it will be noted that the same reference characters are employed as those employed in FIGS. 1 through 8, except in respect to the camming means for effecting movement of the pipe-engaging jaws towards the well pipe or casing C.

In FIG. 9 it will be noted that the outer ring 40 carries rollers 287 mounted upon shafts 234. In addition, the jaws 265 are provided with a compound camming surface including oppositely disposed cam surfaces 285a and 285b, with an intervening neutral section 285c on the respective jaws 265, so that the same jaw-actuating effect as that obtained by the construction of FIG. 3 is also attained by the construction of FIG. 9. Otherwise, the construction of FIG. 9 is idential to FIG. 3 and need not be further described.

It will be appreciated that in the respective embodiments of the pipe gripping mechanisms hereinabove specifically described, the provision of the camming surfaces 85a, 85b, 85c, on the outer partial ring 40, as best seen in FIG. 3, for engagement with a cam follower roller 87 carried by the respective jaws 65, on the one hand, and as in FIG. 9 the provision of camming surfaces 285a, 285b, 285c on the respective jaws 265 engaged by the rollers 287, are principally matters of choice. In either case the camming effect is caused by the angular movement of the outer ring 40 relative to the die carrying inner ring 60, so that in the respective structures of FIG. 3 and FIG. 9 the surfaces 85a and 85b constitute a driving cam surface, while the jaws 65 and particularly the roller thereon constitute a follower; while in the structures shown in FIG. 9 the rollers 287 constitute driving cam elements engaged with the opposing surfaces of jaws 265 which constitute followers.

Moreover, it will be noted upon reference to FIGS. 3 and 9 particularly, that the die insert 79 in each view is provided with a series of vertically extended teeth, each of which constitutes die means. Therefore, the die insert 79 provides die means disposed in the adjacent quadrants of a circle formed on the opposite sides of the center line of the pipe opening 8 through which the casing passes into the gripping mechanism. In addition the dies 71, when the jaws 65 and 265 are actuated inwardly, engage the casing the casing C in the two quadrants of a circle in opposed relation to the die means constituted by the rows of teeth on the die insert 79, and in the two quadrants of a circle on the opposite side of a line perpendicular to the center line of said opening 8, intersecting with said center line at the axis of the gripping mechanism.

Figure 10:
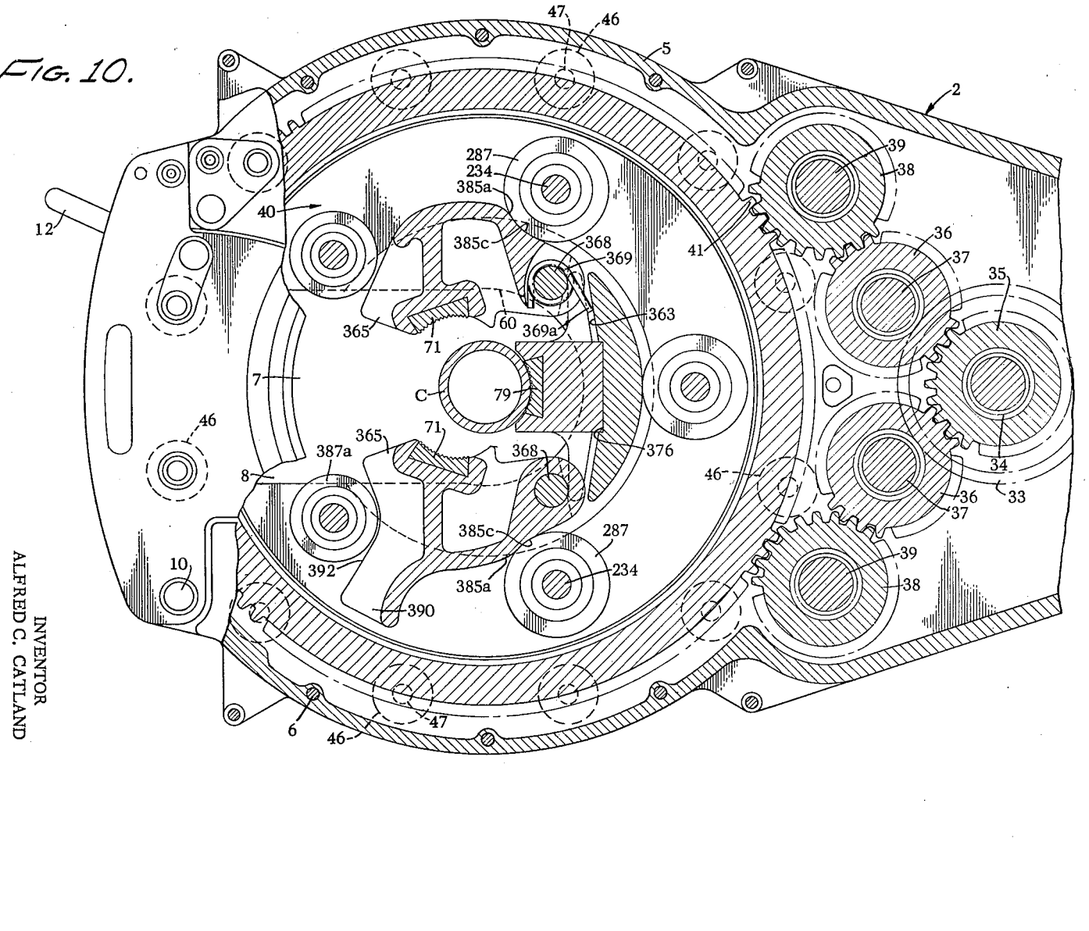
FIG. 10 is a view similar to FIG. 3 but illustrating a modified form of the invention.

Referring now to FIGURE 10 wherein another modified construction is shown, it will be noted that the same reference characters are employed as those employed in FIGS. 1 through 9 except as to those parts specific to the jaw system shown.

In FIG. 10 it will be noted that the outer ring 40 carries rollers 287 mounted upon shafts 234 in a manner like the rollers are carried and mounted as shown in FIG. 9. Likewise, the jaws 365 are provided with a compound camming surface including oppositely disposed cam surfaces 385a and a neutral section 385c on the respective jaws 365, so that the same jaw-actuating effect as that obtained by the tong construction of FIGS. 3 and 9 is also obtained by the construction of FIG. 10 except for the fact that in this construction the camming effect, due to the rollers 287 and the camming surfaces 285a and 285c to move the jaws 365 to pipe engaging position, caused by the angular movement of the outer ring 40 relative to the inner ring 60, will always be clockwise, and angular movement of the outer ring relative to the inner ring to move the jaws 365 to a retracted position will always be counterclockwise as shown in the drawing.

It is to be noted that the jaws 365 and their respective camming surfaces and rollers are arranged to accommodate a small pipe C such as shown in FIG. 10. The die insert 79 is provided with a die carrier block 75 which is thicker than the preceding figures so as to place the die insert 79 closer to the center of the pipe C to properly cooperate with jaws 365. The use of a small pipe C in this figure is for purposes of illustration of the versatility of the tong herein disclosed.

Jaws 365 in FIG. 10 are pivoted about pins 368 on the carrier so as to move inwardly and outwardly thereabout in a manner similar to the jaw of FIGS. 1–9. However, in this fiure the left jaw 365 is provided with a torsion spring 369 disposed about pin 368 and which has its ends 369a engaged with a vertical inner wall 363 of the inner ring 60 and with the jaw 365 in such a manner that inward movement of the jaw 365 about the pivot pin 368 toward pipe gripping position will store energy in the spring to bias this jaw 365 outwardly or toward retracted position. Thus, spring 369 urges the left jaw towards retracted position and holds it in retracted position when the inner ring and outer ring are in side opening aligned position.

It will be noted that the other jaw 365 (i.e., to the right of the previously described jaw) is not provided with a spring but is provided with an ear or lug 390 extending in outward direction so as to be operatively interposed between the roller 287 and a roller 287a mounted on the inner ring. Lug or ear 390 is provided with a camming and holding surface 392 which functions in response to the rotation of the outer ring 40 to move this jaw 365 from a pipe gripping position to a retracted position and holds the inner and outer ring in a position so that the inner and outer ring will rotate together upon further rotation of the rings. The spacing between roller 287 and 287a is such that the lug 399 is always interposed therebetween.

From the above, it can be seen that this jaw construction operates in a general way like the jaw mechanisms of the preceding FIGS. 1–9 except that in the preceding jaw mechanism a double spring system was used, that is, a biasing spring 69 was utilized to retract and hold each jaw retracted whereas in the instant case, one of the jaws is provided with a lug or ear which serves to retract and hold this one jaw in retracted position and to hold the inner ring and outer ring together upon continued rotation of these rings after the jaws have been retracted. This jaw system further incorporates other features of the tongs of the preceding figures including such items as the stop mechanism of FIG. 7.

While the specific details of the invention have been herein shown and described, changes and alterations may be resorted to without departing from the spirit thereof as defined in the appended claims.

I claim:
1. A power tong for rotating a pipe comprising:
   a frame having a central pipe opening and a throat leading to said central pipe opening,
   a pair of relatively rotatable rings comprising an outer ring and an inner ring disposed in said pipe opening, each of said rotatable rings having side pipe openings so that a pipe may enter said side pipe opening and said throat to said central pipe opening,
   power transmission means for rotatably driving said outer ring in either direction,
   pipe gripping means on said inner ring including a plurality of radially movable, angularly spaced die means, jaw means pivotally supporting each of said radially movable die means for swinging movements toward and away from said central pipe opening, and cooperative camming means on said jaw means and on said outer ring for camming said jaw means toward said central pipe opening upon rotation of said outer ring in either direction from an intermediate position with respect to said inner ring,
   means for moving said jaw means away from said central pipe opening when said outer ring is moved towards said intermediate position with respect to said inner ring, and
   inner ring positioning means mounted on said outer ring and engageable with said inner ring for limiting relative rotative movement of said rings when said outer ring is rotated to said intermediate position with respect to said inner ring to position said rings so that said side openings are aligned to allow a pipe to be moved laterally through said side openings.

2. The power tong claimed in claim 1, wherein said inner ring positioning means includes stop means on said inner ring and means mounted on said outer ring for engaging said stop means on either side of said stop means depending upon the direction of rotation of said outer ring.

3. The power tong claimed in claim 2, wherein the stop means is defined by a pair of circumferentially spaced, arcuate slots in said inner ring and wherein said means for engaging said stop means comprises a body member having a pair of pin means which are alternatively positioned in either of said slots, and resilient means and detent means operatively connected with said pin means so that depression of one pin into one of said slots effects the release and retraction of the other of said pin means from engagement with the other slot for reversal of operation of said inner ring positioning device.

4. Power tongs, comprising:
   a frame,
   a ring rotatably mounted on the frame,
   a carrier having a central opening therein and supported for rotation coaxially of the ring, the ring and carrier having side openings therein alignable in one relative rotative position therebetween to pass a pipe into and out of the central opening of the carrier,
   means for rotating the ring with respect to the carrier,
   a jaw fixed to the carrier opposite the side opening therein,
   a pair of jaws mounted on the carrier for movement between a retracted position for passing a pipe and an operative position for gripping a pipe on opposite sides of the fixed jaw,
   means responsive to rotation of the ring with respect to the carrier in one direction from side opening aligning to another position, respectively, to move the jaws from retracted to operative positions, and responsive to rotation of said ring with respect to the carrier in the opposite direction from said other to side opening aligning position to move the jaws from operative to retracted position and hold them in said retracted position, and
   carrier positioning means mounted on said ring and cooperating with said carrier to align said side openings upon retraction of said jaws from operative to retracted position by rotation of said ring in said opposite direction and to rotate the carrier with the ring upon further rotation of said ring in said opposite direction.

5. The power tongs claimed in claim 4, wherein said carrier positioning means includes a pair of shiftable pins for engaging abutment means on said carrier when said side openings are aligned and means for permitting said pins to be shifted selectively and alternatively to engage said abutment means depending upon the rotation of said ring.

References Cited by the Examiner
UNITED STATES PATENTS

| | | | |
|---|---|---|---|
| 2,618,468 | 11/1952 | Lundeen | 81—57 |
| 2,703,221 | 3/1955 | Gardner | 81—57 |
| 2,879,680 | 3/1959 | Beeman et al. | 81—53 |
| 2,989,880 | 6/1961 | Hesser et al. | 81—53 |
| 3,180,186 | 4/1965 | Catland | 81—57 |

WILLIAM FELDMAN, *Primary Examiner.*

JAMES L. JONES, JR., *Examiner.*